United States Patent [19]

Christy et al.

[11] Patent Number: 4,714,729

[45] Date of Patent: Dec. 22, 1987

[54] ULTRAVIOLET LIGHT-STABLE IGNITION RESISTANT THERMOPLASTIC MOLDING COMPOSITIONS

[75] Inventors: Mark R. Christy; Ernest L. Ecker, both of Midland, Mich.

[73] Assignee: The Dow Chemical Company, Midland, Mich.

[21] Appl. No.: 822,723

[22] Filed: Jan. 27, 1986

[51] Int. Cl.$^4$ .............................................. C08K 5/10
[52] U.S. Cl. .................................... 524/281; 524/280; 524/373; 524/411; 524/412
[58] Field of Search ............... 524/280, 281, 373, 411, 524/412; 558/274

[56] References Cited

U.S. PATENT DOCUMENTS

| | | | |
|---|---|---|---|
| 2,337,172 | 12/1943 | Wojcik | 524/280 |
| 2,846,481 | 8/1958 | Roth et al. | 558/274 |
| 3,120,557 | 2/1964 | Stenseth et al. | 558/274 |
| 3,152,168 | 10/1964 | Fincke et al. | 558/274 |
| 3,382,207 | 5/1968 | Jaquiss | 524/281 |
| 3,624,024 | 11/1971 | Caldwell et al. | 524/281 |
| 3,688,001 | 8/1972 | Exner et al. | 524/281 |
| 4,012,343 | 3/1977 | Raley | 524/373 |
| 4,038,248 | 7/1977 | Anderson | 524/373 |
| 4,058,501 | 11/1977 | Anderson | 524/373 |
| 4,130,605 | 12/1978 | Barkhuff | 524/371 |
| 4,301,058 | 11/1981 | Neukerchen et al. | 524/412 |

FOREIGN PATENT DOCUMENTS 1519788 8/1978 United Kingdom .

OTHER PUBLICATIONS

CA 64, 19912(d) (1966).
Eng P. Chang et al-J. Applied Polymer Sci., vol. 21, No. 8 (Aug. 1977), pp. 2167-2180.

Primary Examiner—Veronica P. Hoke
Attorney, Agent, or Firm—Barbara J. Sutherland

[57] ABSTRACT

The novel compositions of this invention are ignition resistant thermoplastic compositions comprising in admixture a thermoplastic resin and an ignition resistant additive selected from the group consisting of: at least one unsymmetrical carbonic acid ester of the general formula

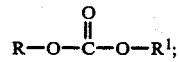

at least one unsymmetrical ether of the general formula

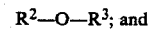

a mixture of at least one unsymmetrical carbonic acid ester and at least one unsymmetrical ether;

wherein R, $R^1$, $R^2$ and $R^3$ are selected from the group consisting of a halogenated aryl group, a halogenated alkyl group, a halogenated ether group, and mixtures thereof, containing a halogen selected from the group consisting of Br, Cl, I, Fl, and mixtures thereof, wherein R and $R^1$ are dissimilar and $R^2$ and $R^3$ are dissimilar.

13 Claims, No Drawings

ULTRAVIOLET LIGHT-STABLE IGNITION RESISTANT THERMOPLASTIC MOLDING COMPOSITIONS

BACKGROUND OF THE INVENTION

This invention relates to new and novel compounds, and in particular to ignition resistant polymer compositions containing the new and novel compounds.

Ignition resistance has been found to be a desirable quality for various thermoplastic compounds. These thermoplastic compounds are often used in business machine and office equipment structures and in electronics and telecommunications equipment, for example, in which malfunctioning electrical components or other sources of ignition pose a threat of fire. Other uses include thermoplastics for home construction and tools of various types. Thermoplastic resins exhibit differing ignition temperatures, but in general will support combustion after the source of ignition is removed, at least for several seconds. This may be a sufficient time period to cause substantial damage to the structure itself and also to enable the ignition of surrounding materials.

However, the time of combustion can be significantly reduced when an ignition resistant compound is incorporated into the thermoplastic resin. A number of ignition resistant compounds have been identified to date. Many of these compounds contain halogens and have been used successfully with thermoplastics. However, two problems have been encountered with these. First, their use tends to adversely affect the physical properties, notably impact resistance, of the thermoplastic, and second, their use also tends to impart substantially increased ultraviolet and visible light instability to the thermoplastic, which is itself in many cases already somewhat unstable in this area. This latter problem, which results in increasing discoloration with time, harms the commercial desirability of the final product.

Therefore, it would be desirable to have a group of compounds that impart both improved impact strength and improved ultraviolet light stability, as well as ignition resistance, when incorporated into a thermoplastic composition. The present invention is such a group of compounds.

SUMMARY OF THE INVENTION

The novel compositions of this invention are ignition resistant thermoplastic compositions comprising in admixture a thermoplastic resin and an ignition resistant additive selected from the group consisting of: at least one unsymmetrical carbonic acid ester of the general formula

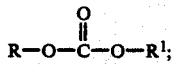

at least one unsymmetrical ether of the general formula

a mixture of at least one unsymmetrical carbonic acid ester and at least one unsymmetrical ether;
wherein $R$, $R^1$, $R^2$ and $R^3$ are selected from the group consisting of a halogenated aryl group, a halogenated alkyl group, a halogenated ether group, and mixtures thereof, containing a halogen selected from the group consisting of Br, Cl, I, F, and mixtures thereof, wherein $R$ and $R^1$ are dissimilar and $R^2$ and $R^3$ are dissimilar.

DESCRIPTION OF THE PREFERRED EMBODIMENTS

According to the present invention, the ester or ether to be used as an ignition resistant additive must be unsymmetrical in order to impart improved ultraviolet and visible light stability and to maintain the polymer's physical properties, as well as to optimize ignition resistance. The unsymmetrical carbonic acid esters and ethers comprise hybrid compounds that demonstrate the improved characteristics when compared with either symmetrical parent compound. Thus, it is important that, in the general formulas noted above, $R$ and $R^1$ are dissimilar and $R^2$ and $R^3$ are dissimilar. However, $R$ may of course be the same as $R^2$ or $R^3$, $R^1$ may be the same as $R^2$ or $R^3$, and so forth.

Possible halogens in this invention include bromine, chlorine, iodine, fluorine and mixtures thereof. For example, it was found that unsymmetrical octabromodiphenyl carbonate, i.e., pentabromophenyl 2,4,6-tribromophenyl carbonate, was superior in its improvement of qualities when compared with either a symmetrical bis(2,4,6-tribromophenyl) carbonate or a symmetrical decabromodiphenyl carbonate; thus, bromine is the preferred halogen. Increased loading levels of the additive increases the ignition resistance of the thermoplastic composition. However, acceptable ignition resistance can be attained using this compound at a level that does not substantially interfere with the polymer's integrity. For this, the additive may preferably be added in an amount within the range of about 5 percent to about 25 percent by weight of halogen in the overall composition, and more preferably within the range of about 10 percent to about 15 percent. The same loading levels also apply when other unsymmetrical compounds of the present invention are used in ignition resistant compositions.

Processing temperatures for the thermoplastic resin with the selected ignition resistant compound or compounds are those that would be customary for ignition resistant thermoplastic compositions in general. In this invention, the thermoplastic resin serves as the polymer matrix in which the hybrid compound is an additive. Among possible thermoplastic resins used here are polystyrenes, homopolymers and copolymers of acrylonitrile, styrene, vinyl acetate, vinylidene halides, butadiene and isoprene, and alloys and blends including but not limited to polycarbonate/acrylonitrile butadiene styrene (ABS), polyphenylene ether/high impact polystyrene, polyphenylene oxide/high impact polystyrene, ABS/polyvinyl chloride, styrene acrylonitrile (SAN)-/ethylene propylene diene rubber (EPDM) terpolymer and others. Generally, blends and alloys combining one or more of the following are suitable for the present invention: ABS; SAN; polycarbonate; polyolefins; polyphenylene oxide; polyphenylene ether; polystyrene; and polyvinyl chloride. Of these, polystyrene, ABS and SAN/EPDM are preferred resins. Other additives may also be used without interfering with the composition's inherent ignition resistance. These include heat stabilizers, ultraviolet light stabilizers, impact modifiers, pigments, drip suppressants and the like.

The unsymmetrical ester or ether of the structure noted is incorporated by melt-blending it into the thermoplastic resin. This formulation may then be molded into the desired configuration. Various molding methods which may be used are: injection molding; compression molding; vacuum forming; injection blow molding; structural foam including conventional low pressure, high pressure and expanding mold using either chemical or physical blowing agents; extrusion, including profile, pipe, wire and cable, sheet, and coextrusion; coinjection molding; and thermoforming. A synergist is often used to increase the ignition resistance of the composition without adding more of the ignition resistant compound. Antimony trioxide is the most commonly used synergist for this purpose, but other possible synergists include zinc borate, other boron compounds, tin oxide, zinc oxide, aluminum trioxide, trihydroxide and mixtures of these. When used, the level of the synergist is preferably up to about 50 percent based on the weight percent of halogen in the overall composition, more preferably within the range of about 25 percent to about 40 percent, and most preferably within the range of about 30 percent to about 35 percent.

Where a mixed carbonic acid ester is chosen, it may be a polyhalodiphenyl carbonic acid ester, preferably octabromodiphenyl carbonate of the formula

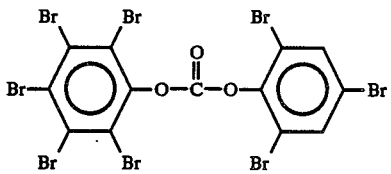

where both R and $R^1$ are halogenated phenyl groups, and unhalogenated sites may be either hydrogen or methyl groups. If hydrogen groups are located at these sites, the compound is pentabromophenyl 2,4,6-tribromophenyl carbonate. Various combinations of halogenated alkyl and aryl groups are also possible, such as in a hybrid compound having a trihaloneopentyl group and a halogenated phenyl group, for example:

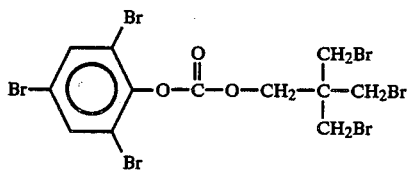

This compound, 2,4,6-tribromophenyl tribromoneopentyl carbonate, would exhibit improved ultraviolet light stability over either the symmetrical bis(tribromoneopentyl) carbonate parent or the symmetrical bis(2,4,6-tribromophenyl) carbonate parent.

Where a mixed ether is chosen, the same possiblities apply, in which at least one of $R^2$ and $R^3$ may be a halogenated alkyl group, a halogenated aryl group, or a halogenated ether group. An example of a mixed ether that would exhibit improved qualities is

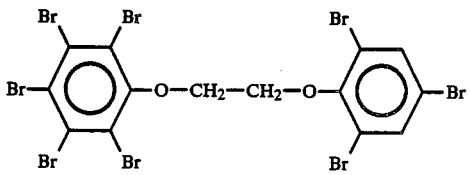

This unsymmetrical diether, pentabromophenoxy 2,4,6-tribromophenoxy ethane, would show improved light stability over either a bis(pentabromophenoxy)ethane or a bis(2,4,6-tribromophenoxy)ethane.

Other mixed carbonic acid esters and mixed ethers are also included within the scope of this invention. It is important to note that where a halogenated alkyl group is being used in this invention, it may be either a straight-chain or branched alkyl group. Comparisons with the performance of a hybrid compound are essentially limited to the performance of the two corresonding parent compounds, since obviously a wide variation in qualities will be found among the hybrid compounds. Preparation of the hybrid and mixed carbonic acid esters is by methods well known in the art. For example, the mixed carbonic acid esters can be made by reacting an alcohol with phosgene in an about 1:1 mole ratio to produce the chloroformate. This chloroformate, which may be first isolated if desired, is then reacted with a second alcohol, again in an about 1:1 mole ratio. Both reactions are generally catalyzed by a weak base, commonly pyridine. Temperature and pressure may be varied to suit the desired outcome. Upon completion of the reaction, the ester is recovered by commonly used methods such as crystallization. The mixed ethers may also be prepared in a variety of well-known processes.

The following example is set forth to more fully and clearly show the present invention. It is intended to be, and should be construed as being, merely illustrative and not limitative of the invention. Unless otherwise indicated, all parts and percentages are by weight.

EXAMPLE 1

About 81 g of unsymmetrical octabromodiphenyl carbonate (i.e., pentabromophenyl 2,4,6-tribromophenyl carbonate) was melt blended with about 567 g of acrylonitrile butadiene styrene and about 27 g of antimony trioxide having a particle size of less than 2 $\mu$m. The octabromodiphenyl carbonate had been prepared earlier by crystallization from methylene dibromide in a commonly known process.

The formulation was prepared on a Farrel Variable Roll Speed, Fixed Roll Friction, 6"×13" 2-Roll Laboratory Mill according to the following conditions:
Variable Roll: 35 rpm,
Front Roll: 196° C.±3° C.,
Back Roll: 168° C.±3° C.,
Time/Sample: 19 minutes.

The formulation was then used to prepare compression molded specimens which were used for flammability and ultraviolet light stability testing. Standard molding techniques were employed. The Underwriters' Laboratory Standard UL-94 Test (1982) was chosen for flammability testing because it is used to determine flammability ratings for office equipment and business machine parts, among other things. Under this test, a rating of V-0 was recorded.

The burn time of the unsymmetrical octabromodiphenyl carbonate composition was then compared with that of the two symmetrical parent compounds, bis(2,4,6-tribromophenyl) carbonate and decabromodiphenyl carbonate compounded with the same amount of antimony trioxide.

| Compound in ABS Composition | Total Burning Time, Sec. |
|---|---|
| Unsymmetrical pentabromophenyl 2,4,6-tribromophenyl carbonate | 0 |
| Symmetrical bis(2,4,6-tribromophenyl) carbonate | >200 |

| Compound in ABS Composition | Total Burning Time, Sec. |
|---|---|
| Symmetrical decabromodiphenyl carbonate | ~226 |

The specimens were also used for ultraviolet light exposures to determine stability. Long term, low intensity exposures were performed on an Atlas HP-UV Accelerated UV Exposure Apparatus for about 307 hours at ambient temperature and humidity. Measurement was with a Dian Match Scan Spectrophotometer. Under this test, the result obtained showed a ΔE value of about 7.37 for the octabromodiphenyl carbonate (i.e., pentabromophenyl 2,4,6-tribromophenyl carbonate). This ΔE value was then compared with that of two other similarly prepared ABS compositions made using other commercially available ignition resistant additives. The results were as follows:

| Ignition Resistant Additive | ΔE |
|---|---|
| bis(tribromophenoxy)ethane | 13.48 |
| octabromodiphenyl oxide | 26.14 |
| pentabromophenyl 2,4,6-tribromophenyl carbonate | 7.37 |

The lower the ΔE value, the less the color discoloration with time. Another comparative reading, this time of the values for the symmetrical parent compounds, showed a ΔE for the bis(2,4,6-tribromophenyl) carbonate of 32.00, and for the decabromodiphenyl carbonate of 17.45. Thus, the unsymmetrical compound showed a significant improvement in ultraviolet and visible light stability over its symmetrical parent compounds.

Finally, impact strength testing was performed on injection molded specimens of the same formulation. These specimens were conditioned according to ASTM D 618 (i.e., 23° C. and 50 percent relative humidity) and testing was performed under the same conditions. The Notched Izod Impact Test results were obtained in adherence to ASTM D 256, Method A, and the readings on this test for unsymmetrical octabromodiphenyl carbonate showed a Notched Izod Impact Strength of 2.28 ft-lb/in, which compares very favorably with the impact strength of ABS with the symmetrical bis(2,4,6-tribromophenyl) carbonate (0.86 ft-lb/in) or with the symmetrical decabromodiphenyl carbonate (0.83 ft-lb/in).

EXAMPLE 2

ABS was also compounded with the unsymmetrical hybrid compound, tribromoneopentyl 2,4,6-tribromophenyl carbonate, and its symmetrical parent compounds, bis(tribromoneopentyl) carbonate and bis(2,4,6-tribromophenyl) carbonate. Preparation methods and amounts, including amount of the synergist antimony trioxide, were identical with those described in Example 1. Unlike the brominated diphenyls, a comparison between ΔE and the UL-94 ratings approaches a linear relationship according to the kind of bromine: the more aromatic the compound, the greater the ΔE and the less the ignition resistance.

| Compound in ABS Composition | ΔE | UL-94 | Izod (ft-lb/in) |
|---|---|---|---|
| Bis(tribromoneopentyl) carbonate | 15.29 | V-2 | 1.46 |
| Tribromoneopentyl 2,4,6-tribromophenyl carbonate | 16.86 | V-2 | 1.76 |
| Bis(2,4,6-tribromophenyl) carbonate | 32 | HB | 0.86 |

The bis(2,4,6-tribromoneopentyl) carbonate and the tribromoneopentyl tribromophenyl carbonate received comparable V-2 ratings, but this was due to dripping. The burn times were overall longer for the hybrid compound, although not substantially so (13.5 seconds cf. 26 seconds).

It is hypothesized that the lower thermal properties of this group in general as compared with the carbonates of Example 1, along with the variable introduced by comparing two types of bromine (aromatic cf. aliphatic), may account for the less significant differences as to ultraviolet color stability and ignition resistance between the unsymmetrical hybrid compound and its symmetrical parent compounds. However, again an improvement in impact strength, as measured by the Notched Izod results, is seen in compositions employing the unsymmetrical compound as compared with those employing the symmetrical parent compounds. It may be that there is less crystallization of the unsymmetrical compounds when formulated into the resin, and the improved dispersion contributes to the higher impact strength.

EXAMPLE 3

About 120 g of pentabromophenoxy 2,4,6-tribromophenoxy ethane is melt-blended according to the procedures in Example 1 with about 54 g of zinc borate and about 445 g of a styrene acrylonitrile (SAN)/ethylene propylene diene rubber (EPDM) terpolymer blend. This provides a composition having ignition resistance and improved ultraviolet light stability when compared with an SAN/EPDM composition containing either bis(pentabromophenoxy)ethane or bis(2,4,6-tribromophenoxy)ethane.

We claim:

1. An ignition resistant composition comprising in admixture a resin selected from the group consisting of acrylonitrile butadiene styrene, polystyrene, styrene acrylonitrile/ethylene propylene diene rubber terpolymer blends, and mixtures thereof, and 2,4,6-trihalophenyl tribromoneopentyl carbonate, pentahalophenyl 2,4,6-trihalophenyl carbonate, or a mixture thereof, the halogen being Br, Cl, I, F, and mixtures thereof in an amount effective to improve ignition resistance and at least one property selected from the group consisting of ultraviolet light stability and impact strength.

2. The composition of claim 1 wherein R is a halogenated aryl group and $R^1$ is a halogenated alkyl group.

3. The composition of claim 1 wherein both R and $R^1$ are halogenated alkyl groups.

4. The composition of claim 1 wherein the aryl group is a phenyl group.

5. The composition of claim 1 wherein the alkyl group is a neopentyl group.

6. The composition of claim 1 wherein said halogen content is Br.

7. The composition of claim 1 wherein said ignition resistant additive is used in an amount within the range of about 5 percent to about 25 percent by weight of halogen in said composition.

8. The composition of claim 1 wherein said ignition resistant additive is used in an amount within the range of about 10 percent to about 15 percent by weight of halogen in said composition.

9. The composition of claim 1 wherein a synergist is added.

10. The composition of claim 9 wherein said synergist is antimony trioxide.

11. The composition of claim 9 wherein said synergist is added in an amount of up to about 50 percent based on the weight percent of halogen in said composition.

12. The composition of claim 9 wherein said synergist is added in an amount within the range of about 25 percent to about 40 percent based on the weight percent of halogen in said composition.

13. The composition of claim 9 wherein said synergist is added in an amount within the range of about 30 percent to about 35 percent based on the weight percent of halogen in said composition.

* * * * *